(12) United States Patent
Jeong et al.

(10) Patent No.: US 11,501,318 B2
(45) Date of Patent: Nov. 15, 2022

(54) SALES DATA DISPLAY DEVICE AND METHOD

(71) Applicant: HANWHA TECHWIN CO., LTD., Seongnam-si (KR)

(72) Inventors: Song Taek Jeong, Seongnam-si (KR); Jae Cheon Song, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 282 days.

(21) Appl. No.: 16/341,369

(22) PCT Filed: Nov. 9, 2016

(86) PCT No.: PCT/KR2016/012856
§ 371 (c)(1),
(2) Date: Apr. 11, 2019

(87) PCT Pub. No.: WO2018/088579
PCT Pub. Date: May 17, 2018

(65) Prior Publication Data
US 2019/0244216 A1    Aug. 8, 2019

(30) Foreign Application Priority Data

Nov. 8, 2016 (KR) .......................... 10-2016-0148188

(51) Int. Cl.
*G06Q 40/06* (2012.01)
*G06Q 30/00* (2012.01)
(Continued)

(52) U.S. Cl.
CPC ......... *G06Q 30/0185* (2013.01); *G06F 16/00* (2019.01); *G06F 40/103* (2020.01);
(Continued)

(58) Field of Classification Search
CPC .... G06Q 50/10; G06Q 30/0185; G06Q 20/20; G06Q 20/209; G06Q 30/06;
(Continued)

(56) References Cited

U.S. PATENT DOCUMENTS

2005/0275894 A1    12/2005  Minowa
2007/0214061 A1    9/2007   Toyokawa et al.
(Continued)

FOREIGN PATENT DOCUMENTS

JP          5515745         6/2014
KR     10-2005-0064791      6/2005
(Continued)

OTHER PUBLICATIONS

Huiqi Lu, Frederic Claret-Tournier, Chris Chatwin, Rupert C. D. Young, Huiqi Lu, Frederic Claret-Tournier, Chris Chatwin, Rupert C. D. Young, M-Commerce Secured Using Web-enabled Mobile Biometric Agents , Nov. 1, 2007, IEEE, web, 480-483 (Year: 2007).*
International Search Report dated Jul. 28, 2017, in International Application No. PCT/KR2016/012856 (with English Translation).

*Primary Examiner* — I Jung Liu
(74) *Attorney, Agent, or Firm* — H.C. Park & Associates, PLC (57) ABSTRACT

Provided is a method of displaying sales data, the method including: a first displaying operation of displaying an image including at least one point of sales; and a second displaying operation of displaying sales data mapped to the at least one point of sales of the image, wherein the sales data includes one or more items, wherein the second displaying operation includes a display format determining operation in which an item corresponding to a keyword from among the one or more items is determined to be displayed according to a first display format, and the remaining items other than the item
(Continued)

corresponding to the keyword are determined to be displayed according to a second display format.

12 Claims, 8 Drawing Sheets

(51) Int. Cl.
*G06Q 20/20* (2012.01)
*H04N 7/18* (2006.01)
*G06F 16/00* (2019.01)
*G06Q 50/10* (2012.01)
*G06F 40/103* (2020.01)
*G06Q 30/06* (2012.01)

(52) U.S. Cl.
CPC ........... *G06Q 20/20* (2013.01); *G06Q 20/209* (2013.01); *G06Q 30/06* (2013.01); *G06Q 30/0643* (2013.01); *G06Q 40/06* (2013.01); *G06Q 50/10* (2013.01); *H04N 7/18* (2013.01)

(58) Field of Classification Search
CPC ...... G06Q 30/0643; G06Q 40/06; H04N 7/18; G06F 16/00; G06F 40/103
See application file for complete search history.

(56) References Cited

U.S. PATENT DOCUMENTS

| | | | |
|---|---|---|---|
| 2012/0265628 A1* | 10/2012 | Jacobs | ..................... G07G 1/01 705/23 |
| 2013/0117107 A1* | 5/2013 | Evans | ................ G06Q 30/0276 705/14.72 |
| 2013/0218721 A1* | 8/2013 | Borhan | ................ G06Q 20/386 705/26.41 |
| 2016/0189314 A1 | 6/2016 | Nakayama | |
| 2016/0373891 A1* | 12/2016 | Ramer | .................. H04W 4/024 |

FOREIGN PATENT DOCUMENTS

| | | | |
|---|---|---|---|
| KR | 20-0390418 | 7/2005 | |
| KR | 10-2006-0047799 | 5/2006 | |
| KR | 10-2007-0101956 | 10/2007 | |
| KR | 10-0794614 | 1/2008 | |
| KR | 10-2008-0021730 | 3/2008 | |
| KR | 10-0859179 | 9/2008 | |
| KR | 10-2009-0088196 | 8/2009 | |
| KR | 10-2011-0008649 | 1/2011 | |
| KR | 10-2001-0095653 | 11/2011 | |
| KR | 10-1417903 | 7/2014 | |
| KR | 10-1481527 | 1/2015 | |
| WO | WO-2010084585 A1 * | 7/2010 | ......... H04N 21/4828 |

* cited by examiner

SALES DATA DISPLAY DEVICE AND METHOD

CROSS-REFERENCE TO RELATED APPLICATION

This application is a National Stage Entry of International Application No. PCT/KR2016/012856, filed on Nov. 9, 2016, and claims priority from and the benefit of Korean Patent Application No. 10-2016-0148188, filed on Nov. 8, 2016, each of which is incorporated by reference for all purposes as if fully set forth herein.

BACKGROUND

Field

Exemplary implementations of the invention relate to a sales data display device and method.

Discussion of the Background

These days, numerous surveillance cameras are installed in many places, and techniques of recording and storing images acquired using surveillance cameras have been developed.

In particular, devices for obtaining an image of a checkout counter where payment for articles is conducted, to identify a purchaser with respect to particular purchased articles, and analyzing the image, are being actively developed.

However, it is difficult to identify items purchased by a purchaser in real time by using such devices, and moreover, with these devices, there is the inconvenience of having to identify the purchase time of the purchaser afterwards and additionally identify recorded images.

The above information disclosed in this Background section is only for understanding of the background of the inventive concepts, and, therefore, it may contain information that does not constitute prior art.

SUMMARY

Sales data display devices and methods constructed according to exemplary implementations of the invention are capable of simultaneously displaying an image and sales data to enable quick checking of a purchaser's purchased items.

Sales data display devices and methods constructed according to exemplary implementations of the invention are capable of emphasizing a keyword item in the sales data to enable efficient checking of purchased items.

Sales data display devices and methods constructed according to exemplary implementations of the invention are capable of emphasizing can provide statistical information about keyword items to thereby enable quick determination of an abnormality.

Additional features of the inventive concepts will be set forth in the description which follows, and in part will be apparent from the description, or may be learned by practice of the inventive concepts.

According to one aspect of the invention, a method of displaying sales data includes: a first displaying operation of displaying an image including at least one point of sales; and a second displaying operation of displaying sales data mapped to the at least one point of sales of the image, wherein the sales data includes one or more items, wherein the second displaying operation includes a display format determining operation in which an item corresponding to a keyword from among the one or more items is determined to be displayed according to a first display format, and the remaining items other than the item corresponding to the keyword are determined to be displayed according to a second display format.

The first display format may include one of a format of highlighting an item corresponding to the keyword, a format of displaying the item in bold, a format in which the item is displayed underlined, and a format in which the item is displayed as blinking.

The second display format may include one of a format of displaying the remaining items as being blurred and a format of displaying the remaining items as being transparent.

The method may further include, before the first displaying operation, a time period inputting operation in which a display time period of the image is received from a user.

The display time period may include at least one point of sales, wherein, in the first displaying operation, an image corresponding to the display time period is displayed, and in the second displaying operation, one or more pieces of sales data respectively mapped to the at least one point of sales in the display time period are displayed.

The method may further include a third displaying operation in which the number of keywords included in one or more pieces of sales data mapped to one or more points of sales in the display time period is determined, and the number is displayed.

A plurality of the keywords may be included, and in the third displaying operation, the number of each of the plurality of keywords may be displayed.

The method may further include, before the first displaying operation: a sales data receiving operation in which sales data including one or more first signals and a second signal different from the first signal is received from a seller terminal; a point of sales determining operation in which a time when the second signal is received is determined as a point of sales; and a mapping operation in which an image corresponding to a time period from a time before the point of sales by a first time interval to a time after the point of sales by a second time interval, is mapped to the sales data.

In the sales data receiving operation, sales data may be received from at least one of a first seller terminal and a second seller terminal.

The method may further include, after the second displaying operation: a user input acquiring operation, in which a user input regarding an item to be registered, from among the one or more items of the displayed sales data, is acquired; and a keyword adding operation in which a keyword that is to be registered and corresponds to the item to be registered, is added to the keyword based on a user input.

In the second displaying operation, the sales data may be displayed by displaying the sales data over the image.

The second displaying operation may further include a display updating operation in which a display of sales data mapped to a first point of sales is updated to a display of sales data mapped to a second point of sales which is later than the first point of sales.

According to another aspect of the invention, device for displaying sales data includes a controller which displays an image including at least one point of sales and sales data mapped to the at least one point of sales of the image, The sales data may include at least one item, and the controller may determine an item corresponding to a keyword, from among the at least one item, to be displayed according to a first display format, and determine the remaining items, other than the item corresponding to the keyword, to be displayed according to a second display format.

The first display format may include one of a format of highlighting an item corresponding to the keyword, a format of displaying the item in bold, a format of displaying the item as being underlined, and a format of displaying the item as being transparent.

The second display format may include one of a format of displaying the remaining items as being blurred and a format of displaying the remaining items as being transparent.

The controller may receive a display time period of the image including at least one point of sales, from a user, display an image corresponding to the display time period, and display one or more pieces of sales data respectively mapped to the at least one point of sales in the display time period.

The controller may determine the number of keywords included in one or more pieces of sales data mapped to one or more points of sales in the display time period, and display the number.

A plurality of the keywords may be included, and the controller may display the number of each of the plurality of keywords.

The controller may receive sales data including one or more first signals and a second signal different from the one or more first signals, from a seller terminal, and determine, as a point of sales, a time when the second signal is received, and map, to the sales data, an image corresponding to a time period from a time before the point of sales by a first time interval to a time after the point of sales by a second time interval.

The controller may display the sales data by displaying the sales data over the image.

The controller may update a display of sales data mapped to a first point of sales, to a display of sales data mapped to a second point of sales which is later than the first point of sales. According to exemplary embodiments of the invention, an image and sales data are simultaneously displayed to enable a purchaser's purchased items to be quickly checked.

According to exemplary embodiments of the invention, a keyword item is emphasized in sales data to enable efficient checking of purchased items.

According to exemplary embodiments of the invention, statistical information about keyword items is provided to thereby enable quick determination of an abnormality.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Embodiments of the invention may be described in terms of functional block components and various processing steps. Such functional blocks may be realized by any number of hardware and/or software components configured to perform the specified functions. For example, the embodiments of the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the embodiments of the invention may be implemented with any programming or scripting language such as C, C++, Java, assembler, or the like, with the various algorithms being implemented with any combination of data structures, processes, routines or other programming elements. Functional aspects may be implemented in algorithms that execute on one or more processors. Furthermore, the embodiments of the invention could employ any number of conventional techniques for electronics configuration, signal processing and/or data processing and the like. The words "mechanism," "element," "means," and "configuration" are used broadly and are not limited to mechanical or physical embodiments, but can include a series of software routines in conjunction with processors, etc.

Figure 1:
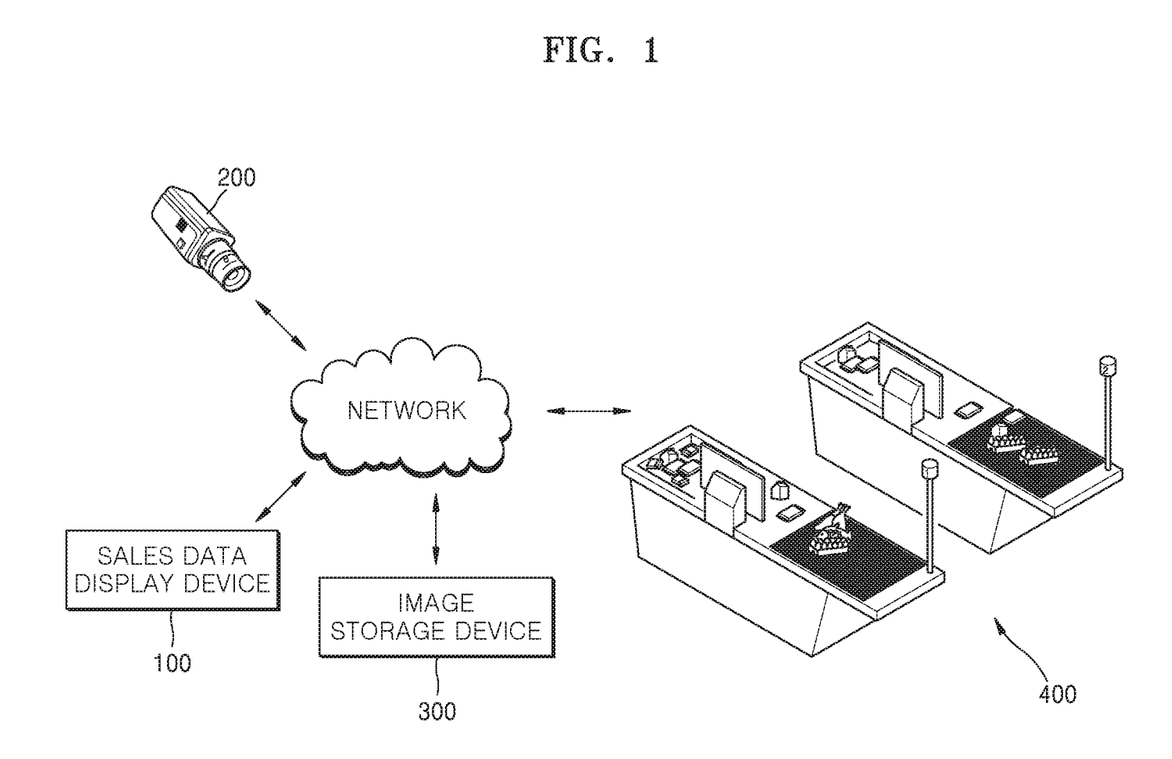
FIG. 1 is a schematic view of a sales data display system according to an exemplary embodiment of the invention.

FIG. 1 is a schematic view of a sales data display system according to an exemplary embodiment of the invention.

Referring to FIG. 1, the sales data display system according to an exemplary embodiment of the invention may include a sales data display device 100, a surveillance camera 200, an image storage device 300, and a seller terminal 400.

The surveillance camera 200 according to an exemplary embodiment of the invention may be a device including a lens and an image sensor. In the invention, a lens may be a lens group including one or more lenses. An image sensor may convert an image input through a lens, to an electrical signal. For example, an image sensor may be a semiconductor device capable of converting an optical signal to an electrical signal (hereinafter referred to as an image), such as a charge-coupled device (CCD) or a complementary metal oxide semiconductor (CMOS).

The surveillance camera 200 may be a camera providing an image formed of RGB with respect to space to be photographed, an infrared image or a distance image including distance information, or the like.

The surveillance camera 200 may be installed to acquire an image of the seller terminal 400 as illustrated in FIG. 1. However, this is exemplary, and the inventive concepts are not limited thereto.

The surveillance camera 200 may transmit an acquired image to the sales data display device 100 and/or the image storage device 300 via a network. The network may be, for example, a wireless network, a wired network, a public network such as the Internet, a private network, a global system for mobile communication network (GSM), a general packet radio network (GPRS), a local area network (LAN), a wide area network (WAN), a metropolitan area network (MAN), a cellular network, a public switched telephone network (PSTN), a personal area network, Bluetooth, Wi-Fi Direct, Near Field communication, ultra wide band, a combination thereof, or another arbitrary network, but is not limited thereto.

In the embodiments of the invention, one or more surveillance cameras 200 may be included. However, for convenience of description, description will be based on a single surveillance camera 200.

The image storage device 300 according to an exemplary embodiment of the invention may receive a multimedia object such as a picture, an image, and a sound acquired using the surveillance camera 200, from the surveillance camera 200 via a network and store the same. In addition, the image storage device 300 may provide a multimedia object such as a picture, an image or a sound stored in the image storage device 300, to the image storage device 300, according to a request by the sales data display device 100.

The image storage device 300 may be various means that may store information handled using an electronic communication device and provide the information again. For example, the image storage device 300 may be one of a video management system (VMS), a central management system (CMS), a network video recorder (NVR), and a digital video recorder (DVR). The image storage device 300 may also be a personal computer or a portable terminal. However, this is exemplary, and the inventive concepts are not limited thereto, and any device that receives an image acquired using the surveillance camera 200 via a network and displays and/or stores the image may be used as the image storage device 300 without limitation.

The image storage device 300 may further store sales data acquired using the seller terminal 400 in addition to a multimedia object acquired using the surveillance camera 200. In addition, the image storage device 300 may provide stored sales data to the sales data display device 100 according to a request by the sales data display device 100. However, this is exemplary, and the inventive concepts are not limited thereto.

The seller terminal 400 according to an exemplary embodiment of the invention may be various devices that may acquire information about goods and transmit the information to the sales data display device 100. For example, the seller terminal 400 may be a point of sales (POS) device including a barcode reader reading a barcode attached to an article, a calculator adding an article corresponding to the read barcode to a sales list and calculating the sales value, and a display unit displaying a result of calculation conducted by the calculator. However, this is exemplary, and the inventive concepts are not limited thereto. Any device that identifies goods and generates sales data corresponding to the goods may be used as the seller terminal 400 according to the inventive concepts.

Figure 2:
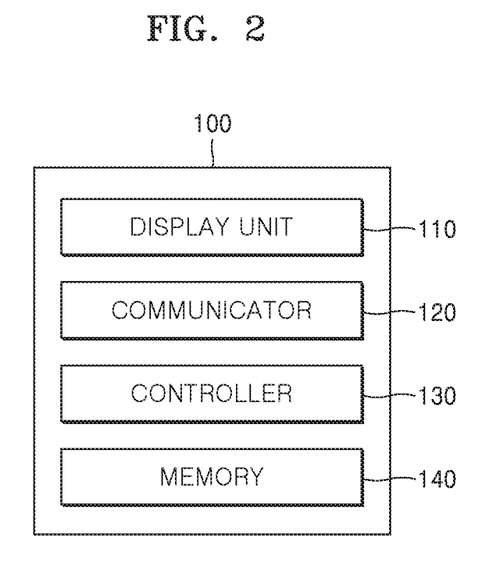
FIG. 2 is block diagram of a configuration of a sales data display device according to an exemplary embodiment of the invention.

FIG. 2 is schematic view of a configuration of a sales data display device 100 according to an exemplary embodiment of the invention.

Referring to FIG. 2, the sales data display device 100 according to an exemplary embodiment of the invention may include a display unit 110, a communicator 120, a controller 130, and a memory 140.

The display unit 110 according to an exemplary embodiment of the invention may refer to a display device displaying a figure, a character or an image according to an electrical signal generated using the controller 130. For example, the display unit 110 may be configured using one of a cathode ray tube (CRT), a liquid crystal display (LCD), a plasma display panel (PDP), a light-emitting diode (LED), and an organic light-emitting diode (OLED), but the inventive concepts are not limited thereto.

The communicator 120 according to an exemplary embodiment of the invention may be a device including a hardware component and a software component needed by the sales data display device 100 to transmit or receive a control signal and/or an image via wired or wireless connection to an external device such as the surveillance camera 200 and the image storage device 300.

The controller 130 according to an exemplary embodiment of the invention may include any type of devices capable of processing data, such as a processor. Here, a 'processor' may refer to, for example, a data processing device that is embedded in a hardware and has a physically structured circuit to perform a function expressed by codes or commands included in a program. Examples of a data processing device embedded in a hardware may encompass a microprocessor, a central processing unit (CPU), a processor core, a multiprocessor, an application-specific integrated circuit (ASIC), a field programmable gate array (FPGA) or the like, but the inventive concepts are not limited thereto.

The memory 140 according to an exemplary embodiment of the invention has a function of temporarily or permanently storing data processed by the sales data display device 100. The memory may include magnetic storage media or flash storage media, but the inventive concepts are not limited thereto.

The sales data display device 100 according to an exemplary embodiment of the invention may be a device included in the image storage device 300 described above. For example, the sales data display device 100 may be a device included in any one of a video management system (VMS), a central management system (CMS), a network video recorder (NVR), and a digital video recorder (DVR). In addition, the sales data display device 100 may be a device included in the surveillance camera 200.

However, for convenience of description, the description herein will be based on the assumption that the sales data display device 100 is an independent device.

Figure 3:
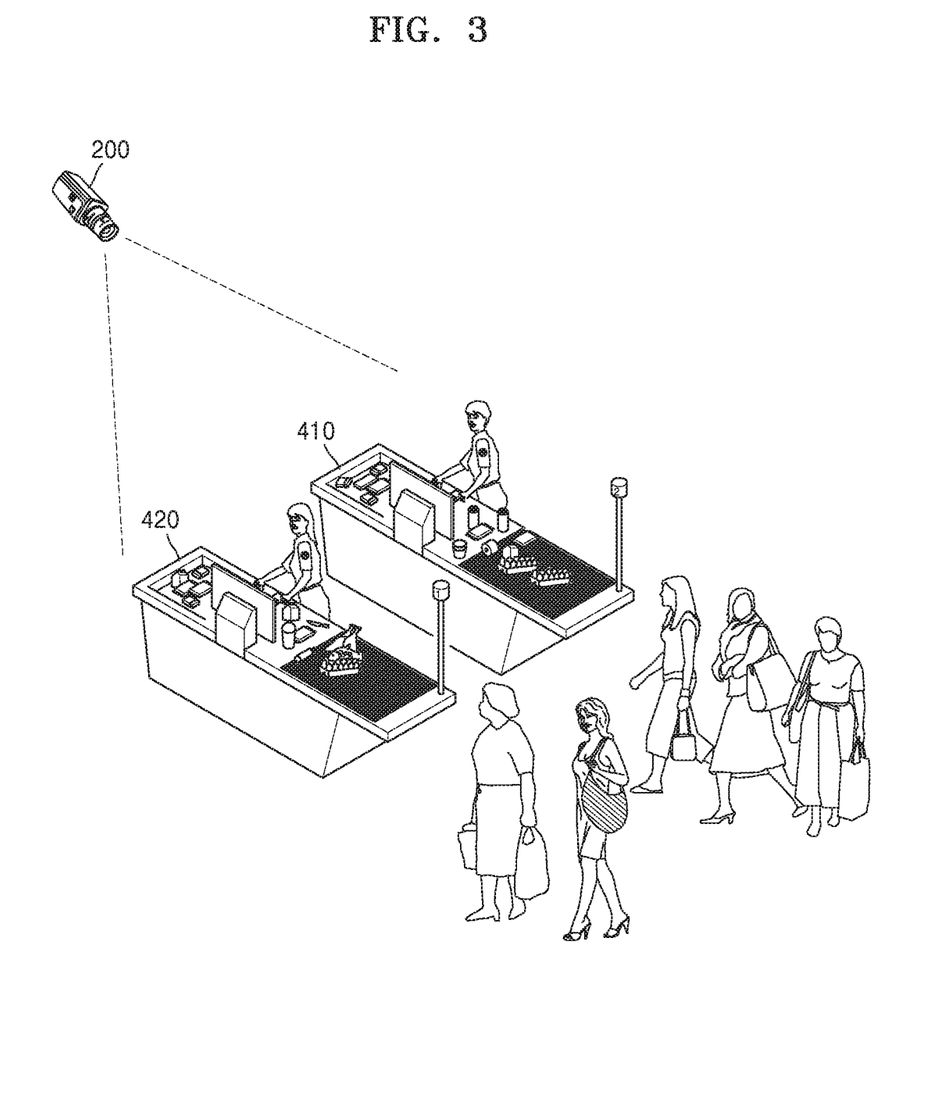
FIG. 3 illustrates an example of installation of a sales data display system according to an exemplary embodiment of the invention.

FIG. 3 illustrates an example of installation of a sales data display system according to an exemplary embodiment of the invention.

Referring to FIG. 3, it is assumed that the surveillance camera 200 acquires images of two seller terminals 410 and 420. In addition, it will be assumed that three customers are waiting to pay at the first seller terminal 410, and two customers are waiting to pay at the second seller terminal 420.

For convenience of description, the description with reference to FIGS. 4 through 6 below will be based on the assumption that a sales data display system according to an exemplary embodiment of the invention is installed as illustrated in FIG. 3.

The controller 130 according to an exemplary embodiment of the invention may receive sales data from the seller terminals 410 and 420 and map the sales data to a partial section of an image acquired using the surveillance camera 200. In other words, the controller performs an operation that associates the sales data to an image or part of an image acquired by the camera 200, as described in more detail below and shown in FIGS. 4-6.

In detail, the controller 130 according to an exemplary embodiment of the invention may receive sales data including one or more first signals and a second signal from the first and second seller terminals 410 and 420. The first signal may be a signal including identification information of goods. The second signal may be a signal indicating that a sale to a corresponding customer is completed.

For example, when a first customer of the first seller terminal 410 purchases 'instant noodles', 'disposable container', 'paper cup', 'cigarette', 'toilet paper' and 'lighter' in FIG. 3, sales data may include a total of six first signals including identification information of each of the described objects and at least one second signal indicating that the sale to the first customer is completed. Here, the second signal may be a signal generated in the first seller terminal 410 based on a 'payment completion signal' and a 'receipt issuing signal' of the first seller terminal 410.

Accordingly, the controller 130 according to an exemplary embodiment of the invention may perceive a first signal received first after receiving a second signal with respect to a previous customer, as a sales start signal for a corresponding customer, and perceive a second signal as a sales completion signal with respect to that corresponding customer.

In addition to the first signal and the second signal described above, the sales data may further include a third signal including additional information such as sales time information, purchaser identification information, payment method information, a total amount, and the like.

The controller 130 according to an exemplary embodiment of the invention may determine a time when a second signal is received, as a point of sales.

A 'point of sales' may refer to a time when a sale to a corresponding customer, i.e. a sales transaction, is completed. In other words, the controller 130 according to an exemplary embodiment of the invention may determine, as a point of sales, a time when a second signal is received, which is a time when a sale is completed.

Next, the controller 130 according to an exemplary embodiment of the invention may map, to sales data, an image corresponding to a time period from a time before the point of sales by a first time interval to a time after the point of sales by a second time interval. As described above, a point of sales indicates a time when a sale to a corresponding customer is completed. Thus, a meaningful image with respect to the customer may be an image corresponding to a time period from a time before the point of sales by a certain time interval to a time after the point of sales by a certain time interval.

Figure 4:
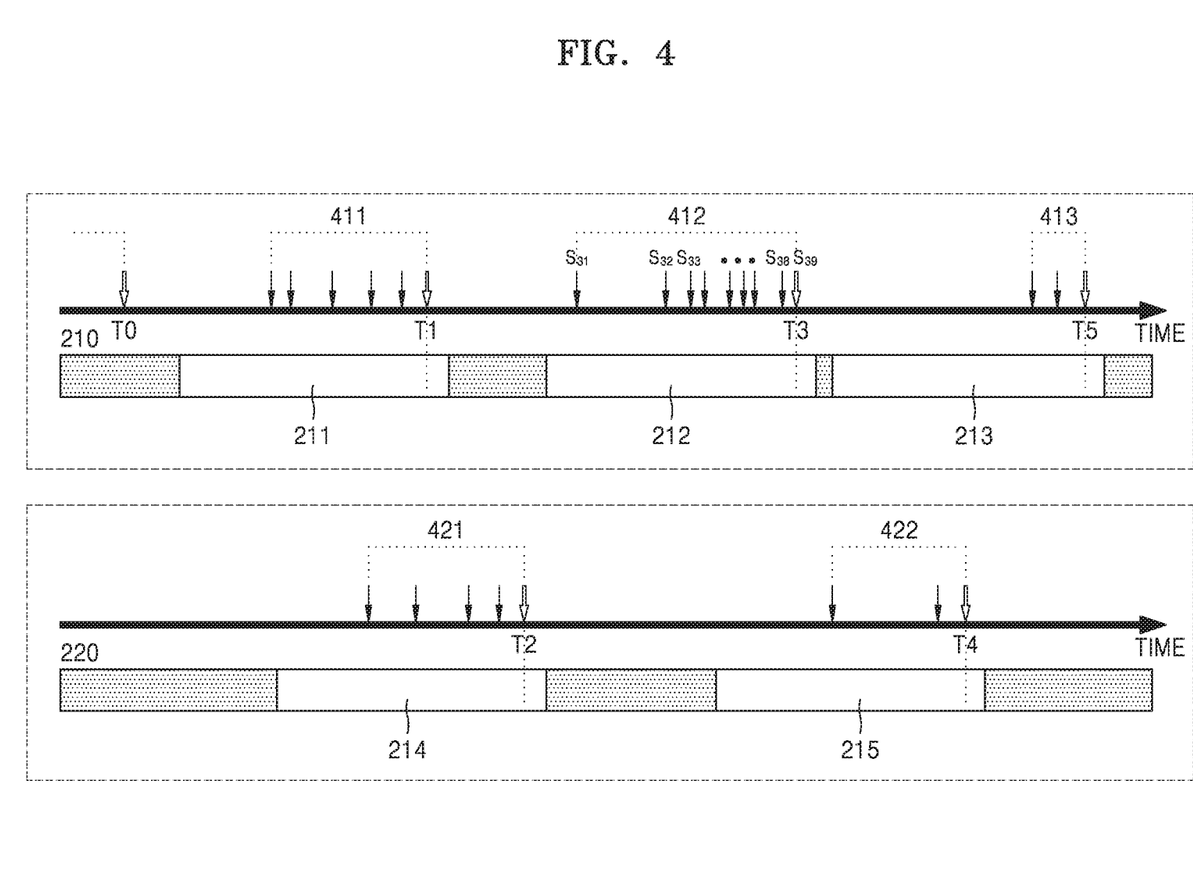
FIG. 4 is a diagram for describing an operation of a controller according to an exemplary embodiment of the invention.

FIG. 4 is a view for describing an operation of a controller 130 according to an exemplary embodiment of the invention.

Referring to FIG. 4, it is assumed that three customer's sales data 411, 412, 413 with respect to the first seller terminal 410 and two customer's sales data 421 and 422 with respect to the second seller terminal 420 are received at times as illustrated. It is assumed that points of sales for the three customers of the first seller terminal 410 are T1, T3, and T5, respectively, and points of sales for the two customers of the second seller terminal 420 are T2 and T4, respectively. It is also assumed that payment for articles by each customer is performed simultaneously at the two seller terminals 410, 420. (That is, payment of the first customer is conducted at the first seller terminal 410 at the time T1, and payment of the second customer is conducted at the second seller terminal 420 at the time T2.) It is also assumed that the surveillance camera 200 has acquired an image including an image 210 of the first seller terminal 410 and an image 220 of the second seller terminal 420.

Under the above assumption, for example, a second customer of the first seller terminal 410 purchases a total of eight items of goods, and accordingly, the controller 130 may receive first signals S31 to S38 with respect to each item of goods and a second signal S39 indicating that the sale is completed.

Next, the controller 130 may map an image 212 corresponding to a time period from a time before a point of sales T3 by a first time interval to a time after the point of sales T3 by a second time interval, to sales data 412. As described above, a point of sales indicates a time when a sale to a customer is completed, and thus, the first time interval may be set longer than the second time interval.

Similarly, the controller 130 may map sales data 411 of the first customer of the first seller terminal 410 to an image 211 corresponding to the sales data 411, and sales data 413 of a third customer to an image 213 corresponding to the sales data 413. The controller 130 may also map sales data 421 of the first customer of the second seller terminal 420 to an image 214 corresponding to the sales data 421, and sales data 422 of the second customer to an image 215 corresponding to the sales data 422.

The controller 130 according to an exemplary embodiment of the invention may display an image acquired by the surveillance camera 200 on the display unit 110. In this case, the image may be a real-time image or a recorded image.

In addition, the controller 130 according to an exemplary embodiment of the invention may display sales data that is mapped to at least one point of sales of an image displayed on the display unit 110, with the image. Here, the controller 130 may determine to display an item corresponding to a keyword from among one or more items included in sales data, with a first display format, and to display the remaining items except the item corresponding to the keywords, with a second display format. The first display format may be, for example, a format of highlighting an item corresponding to a keyword, a format of displaying an item in bold, a format in which an item is displayed underlined, and a format in which a displayed item is blinking. The second display format may be one of a format in which the remaining items displayed are blurred and a format in which the items are displayed as being transparent. However, the first display format and the second display format described above are examples, and the inventive concepts are not limited thereto. Thus, a format in which a certain item is emphasized may be used as the first display format according to the invention, and a format in which a certain item is displayed less distinguishably may be used as the second display format according to the invention, without limitation.

A 'keyword' may be a name of goods with respect to which a purchaser is required to be identified. For example, to determine whether alcohol and tobacco are being sold to teenagers, keywords may be specific product names such as brand names: 'Cass', 'Chamisul', 'makgeolli,' and 'This Plus'.

In addition, to determine sales of products involving a likelihood of crime, keywords may be product names such as 'glue', 'knife for woodwork', and 'ropes'. Accordingly, a keyword may be differently set according to a location and/or environment where the sales data display system according to an exemplary embodiment of the invention is installed.

The controller 130 according to an exemplary embodiment of the invention may display sales data displaying the sales data over an image. In addition, the controller 130 may display sales data on a second display unit separately from an image.

Figure 5A:
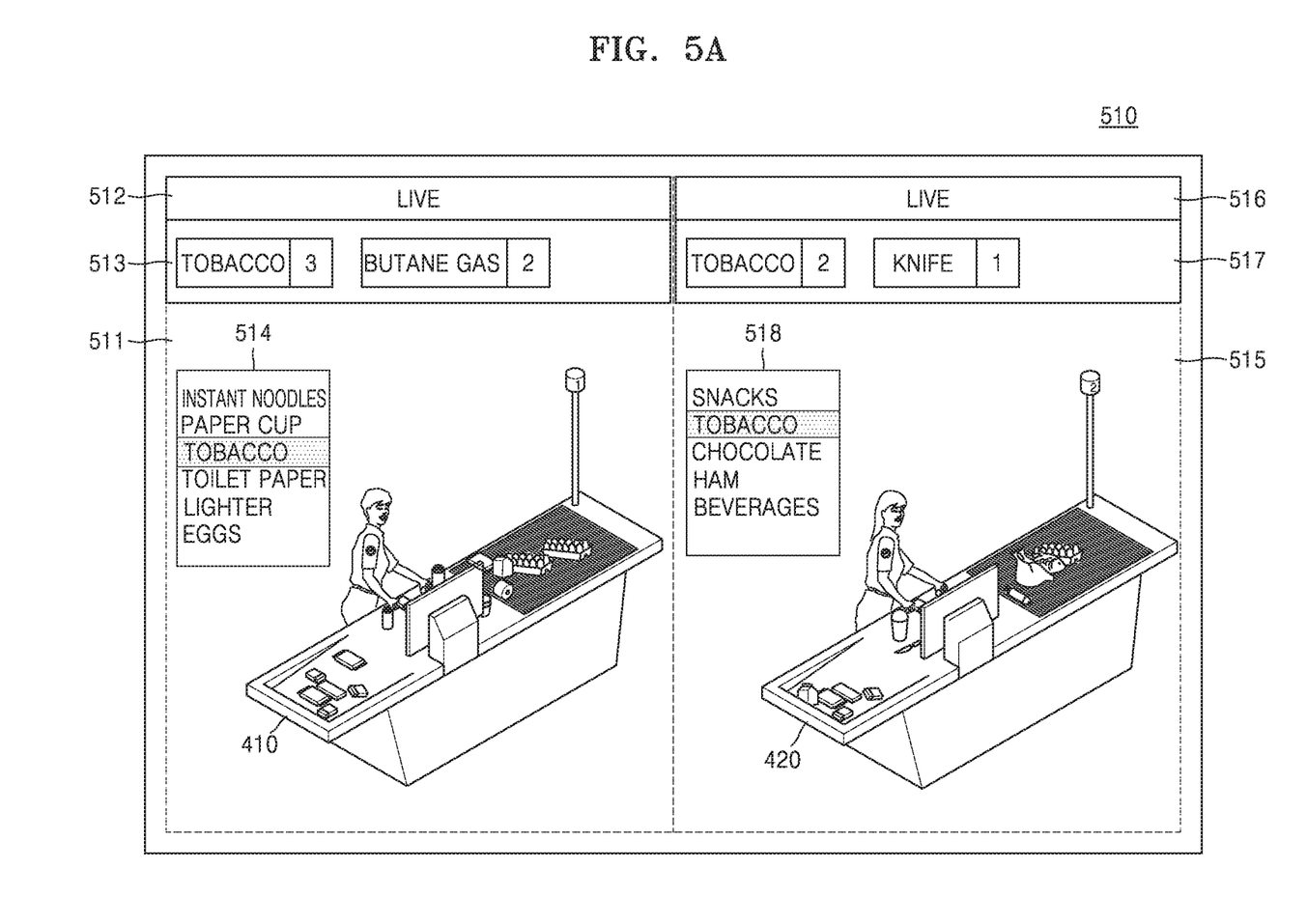
FIG. 5A illustrates an example of a real-time screen displayed using a controller on a display unit at a time T2 of FIG. 4, according to an exemplary embodiment of the invention.

FIG. 5A illustrates an example of a real-time screen 510 displayed using the controller 130, on the display unit 110 at the time T2 of FIG. 4, according to an exemplary embodiment of the invention.

Referring to FIG. 5A, the screen 510 may include an area 511 where an image of the first seller terminal 410 is displayed and an area 515 where an image of the second seller terminal 420 is displayed. Here, in each of the areas 511 and 515, a portion of an image acquired using the surveillance camera 200 may be displayed. In other words, an image acquired using the surveillance camera 200 may include images of the two seller terminals 410 and 420.

The area 511 where an image of the first seller terminal 410 is displayed may include an area 512 displaying a type of a currently displayed image, an area 513 displaying statistical information relating to keywords, such as the number of items purchased corresponding to each keyword, and an area 514 displaying sales data. Similarly, the area 515 where an image of the second seller terminal 420 is displayed may include an area 516 displaying a type of a currently displayed image, an area 517 displaying statistical information about keywords, and an area 518 displaying sales data.

In the case of FIG. 5A, 'tobacco,' 'butane gas', and 'knife' are set as keywords, and statistical information about the keywords is displayed in the areas 513 and 517 displaying statistical information, and in the areas 514 and 518 displaying sales data, 'tobacco' is highlighted as a keyword with a first display format.

The controller 130 may determine a number of keywords included in one or more pieces of sales data mapped to one or more points of sales in a display time period as described above, and display the determined number. Here, when a display image is a 'real-time image' as illustrated in FIG. 5A, the controller 130 may determine the number of keywords by setting a period from a certain time (for example, 0:00 of the corresponding day) to a current time.

When there are a plurality of keywords, the controller 130 may also display the number of each of the plurality of keywords. The controller 130 may also determine the total number of keywords included in sales data mapped to each of one or more points of sales within a display time period regardless of a type of the keywords, and display the total number.

When displaying a real-time image, the controller 130 according to an exemplary embodiment of the invention may display the real-time image by updating sales data at each point of sales. For example, referring back to FIG. 4, the controller 130 may display the sales data 411 of the first customer of the first seller terminal 410 from T1 which is a point of sales for the first customer of the first seller terminal 410 until T3 which is a point of sales for the second customer. In addition, the controller 130 may display sales data 412 of the second customer of the first seller terminal 410 from T3 which is a point of sales for the second customer of the first seller terminal 410 until T5 which is a point of sales for the third customer. Thus, as FIG. 5A corresponds to the screen 510 displayed on the display unit 110 at the time T2 of FIG. 4, the sales data 411 with respect to the first customer of the first seller terminal 410 is displayed in the area 514 displaying sales data, and the sales data 421 with respect to the first customer of the second seller terminal 420 is displayed in the area 518 displaying sales data.

The controller 130 according to an exemplary embodiment of the invention may acquire a user input regarding an item to be registered, from among one or more items of sales data displayed in the areas 514 and 518 displaying sales data, and add a keyword that is to be registered and corresponds to the item to be registered, as a keyword. For example, when a user has selected 'lighter' from the area 514 displaying sales data, the controller 130 may add 'lighter' as a keyword.

Figure 5B:
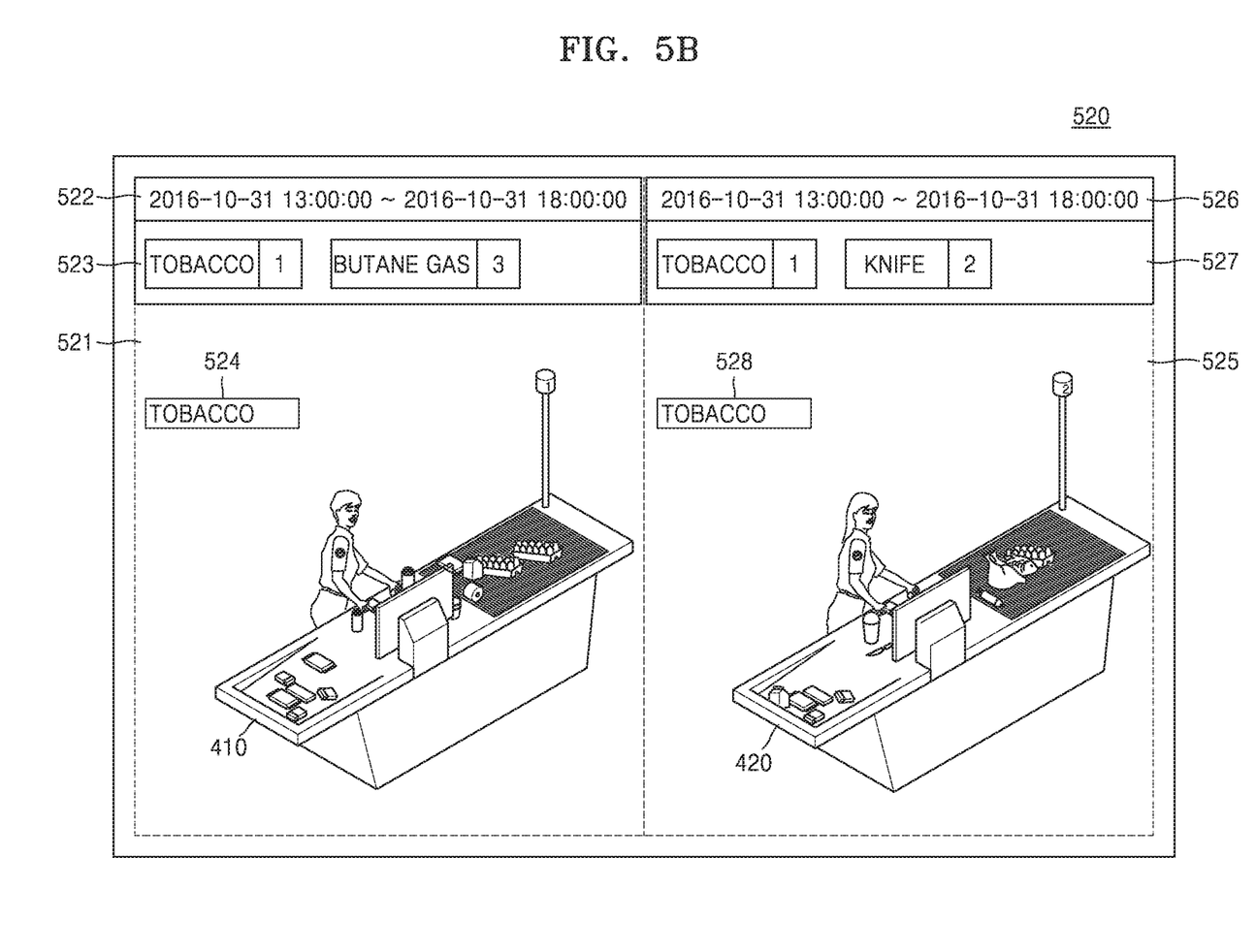
FIG. 5B illustrates an example of a screen in which a controller displays a recorded image and sales data, at a time T2 of FIG. 4, according to an exemplary embodiment of the invention.

FIG. 5B is an example of a screen 520 displaying a recorded image and sales data, displayed using the controller 130, at the time T2 of FIG. 4, according to an exemplary embodiment of the invention.

Referring to FIG. 5B, the screen 520 may include an area 521 where an image of the first seller terminal 410 is displayed and an area 525 where an image of the second seller terminal 420 is displayed. Here, in each of the areas 521 and 525, a portion of an image acquired using the surveillance camera 200 may be displayed. In other words, an image acquired using the surveillance camera 200 may include images of the two seller terminals 410 and 420.

The area 521 where an image of the first seller terminal 410 is displayed may include an area 522 displaying a time period of a currently displayed image, an area 523 displaying statistical information of keywords, and an area 524 displaying sales data. Similarly, the area 525 where an image of the second seller terminal 420 is displayed may include an area 526 displaying a time period of a currently displayed image, an area 527 displaying statistical information of keywords, and an area 528 displaying sales data.

In the case of FIG. 5B, 'tobacco,' 'butane gas', and 'knife' are set as keywords, and statistical information about the keywords is displayed in the areas 523 and 527 displaying statistical information, and in the areas 524 and 528 displaying sales data, only 'tobacco' is displayed. In other words, the controller 130 displays items not corresponding to keywords from among sales data, by making those items not corresponding to keywords transparent, and displays only items corresponding to keywords. In addition, a time period of a display image is set as 'from Oct. 31, 2016, 13:00:00 to Oct. 31, 2016, 18:00:00'.

As described above, the controller 130 according to an exemplary embodiment of the invention may receive a display time period of an image to display an image corresponding to the display time period.

When displaying a recorded image, the controller 130 according to an exemplary embodiment of the invention may display sales data with an image mapped to the sales data, at the same time.

For example, referring back to FIG. 4, when an image regarding the first customer of the first seller terminal 410 is displayed (the image 211 of FIG. 4), the controller 130 may also display the sales data 411 (of FIG. 4) with respect to the first customer. Similarly, when an image regarding the second customer of the first seller terminal 410 (the image 212 of FIG. 4) is displayed, the controller 130 may also display the sales data 412 (of FIG. 4) with respect to the second customer. However, the inventive concepts are not limited thereto, and various times of displaying sales data may be determined according to a setting by a user.

Figure 6:
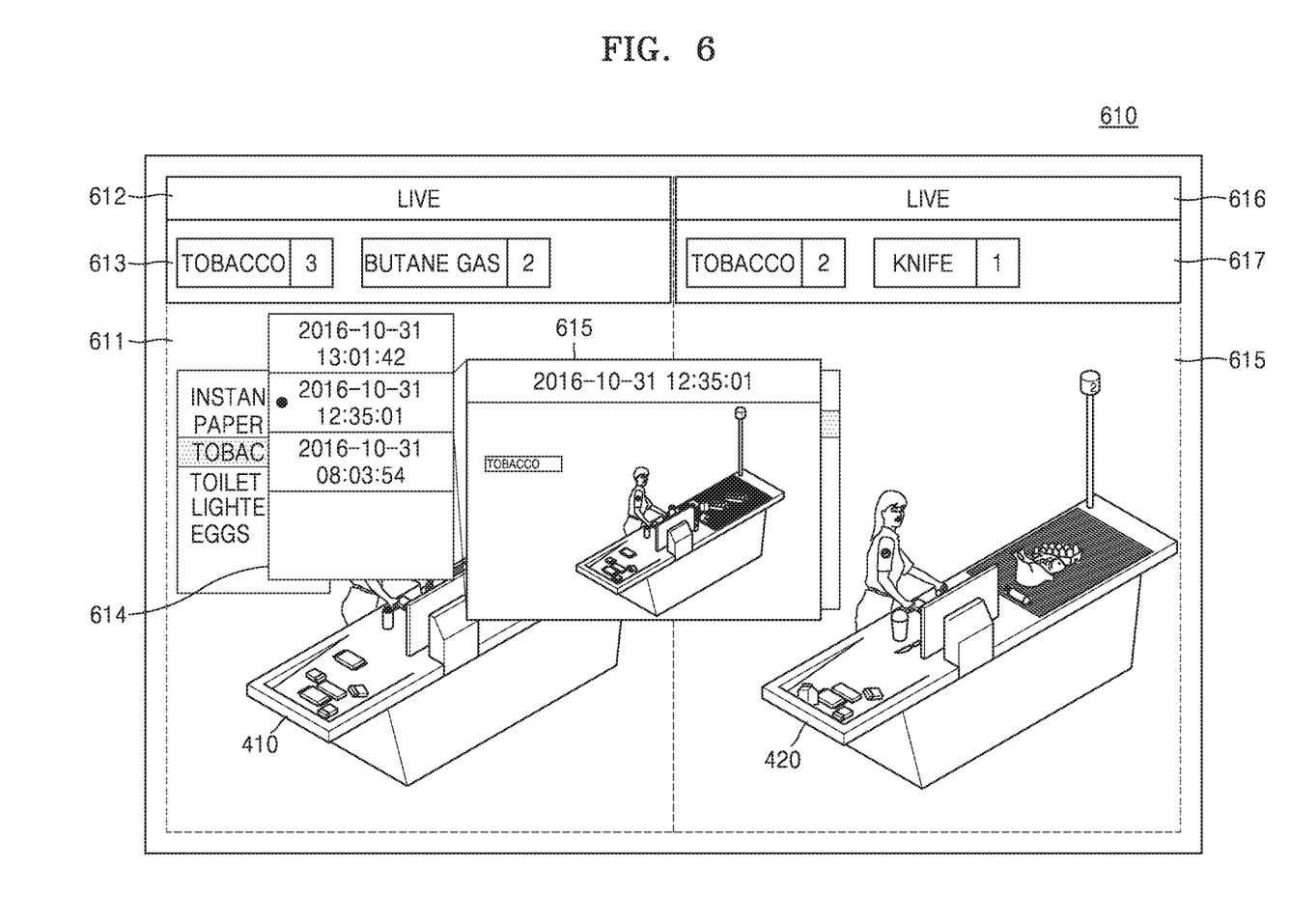
FIG. 6 illustrates a screen in which a controller provides a recorded image based on a user input, according to an exemplary embodiment of the invention.

FIG. 6 illustrates a screen 610 providing a recorded image based on a user input, by the controller 130, according to an exemplary embodiment of the invention.

Referring to FIG. 6, as described above, the screen 610 includes an area 611 displaying an image of the first seller terminal 410, and the area 611 may include an area 612 displaying a type of a currently displayed image and an area 613 displaying statistical information about keywords.

When a user inputs an input regarding, for example, 'tobacco,' the controller 130 may display a point of sales of sales data including this keyword, in a point of sales display area 614, and acquire an input regarding any one of points of sales from among displayed points of sales, and display sales data mapped to the corresponding point of sales and an image in a partial image display area 615.

Thus, a user may determine all the images regarding a particular keyword at a time.

While FIGS. 3 through 6 above, two seller terminals and a display screen divided into two areas are described, this is exemplary, and the inventive concepts are not limited thereto. Thus, one or more seller terminals may be included, and a screen configuration may be different according to the number of seller terminals.

In addition, while images, sales data, and keyword statistics are displayed separately for each seller terminal in FIGS. 5A through 6, this is exemplary, and the inventive concepts are not limited thereto. Thus, sales data of all seller terminals may be displayed on a single display area, and keyword statistics may relate to all seller terminals.

Figure 7:
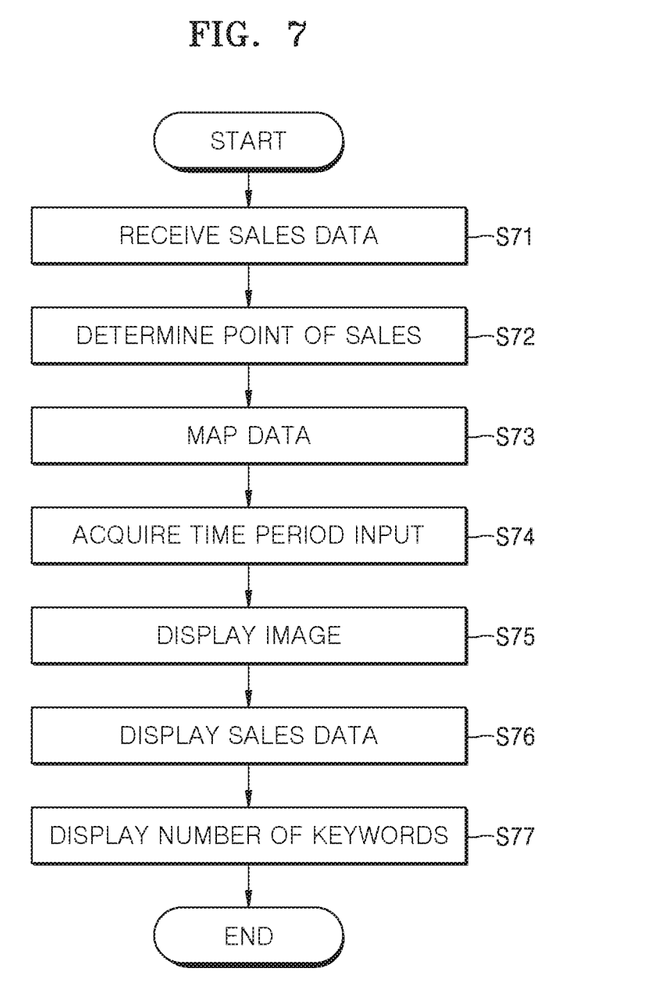
FIG. 7 is a flowchart of an exemplary sales data display method performed using the sales data display device of FIG. 1.

FIG. 7 is a flowchart of a sales data display method performed using the sales data display device 100 of FIG. 1. Hereinafter, description of details provided above with reference to FIGS. 1 through 6 will be omitted to avoid redundancy.

The controller 130 according to an exemplary embodiment of the invention may receive, from the seller terminal 400, sales data including one or more first signals and a second signal. (S71)

The first signal may be a signal including identification information of goods. The second signal may be a signal indicating that a sale to a corresponding customer is completed. For example, when a first customer of the first seller terminal 410 purchases 'instant noodles', 'disposable container', 'paper cup', 'cigarette', 'toilet paper' and 'lighter' in FIG. 3, sales data may include a total of six first signals including identification information of each of the described objects and at least one second signal indicating that the sale to the first customer is completed. Here, the second signal may be a signal generated in the first seller terminal 410 based on a 'payment completion signal' and a 'receipt issuing signal' of the first seller terminal 410. Accordingly, the controller 130 according to an exemplary embodiment of the invention may perceive a first signal received after receiving a second signal with respect to a previous customer, as a sales start signal for a corresponding customer, and perceive a second signal as a sales completion signal with respect to that corresponding customer.

The controller 130 according to an exemplary embodiment of the invention may determine a time when a second signal is received, as a point of sales. (S72)

A 'point of sales' as used herein may refer to a time when sale to a corresponding customer sale is completed. In other words, the controller 130 according to an exemplary embodiment of the invention may determine, as a point of sales, a time when a second signal is received, which is a time when a sale is completed.

Next, the controller 130 according to an exemplary embodiment of the invention may map, to sales data, an image corresponding to a time period from a time before a point of sales by a first time interval to a time after the point of sales by a second time interval. (S73) As described above, a point of sales indicates a time when a sale to a corresponding customer is completed. Thus, a meaningful image with respect to the customer may be an image corresponding to a time period from a time before the point of sales by a certain time interval to a time after the point of sales by a certain time interval.

Referring back to FIG. 4, it is assumed that three customer's sales data 411, 412, 413 with respect to the first seller terminal 410 and two customer's sales data 421 and 422 with respect to the second seller terminal 420 are received at a time as illustrated. It is assumed that points of sales for the three customers of the first seller terminal 410 are T1, T3, and T5, respectively, and points of sales for the two customers of the second seller terminal 420 are T2 and T4, respectively. It is also assumed that payment of goods for each customer is performed simultaneously at the two seller terminals 410, 420. (That is, payment of the first customer is conducted at the first seller terminal 410 at the time T1, and payment of the second customer is conducted at the second seller terminal 420 also at the same time at the time T1.) It is also assumed that the surveillance camera 200 has acquired an image including an image 210 of the first seller terminal 410 and an image 220 of the second seller terminal 420.

Under the above assumption, for example, a second customer of the first seller terminal 410 purchases a total of eight items of goods, and accordingly, the controller 130 may receive first signals S31 to S38 with respect to each item of goods and a second signal S39 indicating that the sale is completed.

Next, the controller 130 may map an image 212 corresponding to a time period from a time before a point of sales T3 by a first time interval to a time after the point of sales T3 by a second time interval, to sales data 412. As described above, a point of sales indicates a time when a sale to a customer is completed, and thus, the first time interval may be set longer than the second time interval.

Similarly, the controller 130 may map sales data 411 of the first customer of the first seller terminal 410 to an image 211 corresponding to the sales data 411, and sales data 413 of a third customer to an image 213 corresponding to the sales data 413. The controller 130 may also map sales data 421 of the first customer of the second seller terminal 420 to an image 214 corresponding to the sales data 421, and sales data 422 of the second customer to an image 215 corresponding to the sales data 422.

The controller 130 according to an exemplary embodiment of the invention may receive a display time period of an image and display an image corresponding to the display time period. (S74) For example, the controller 130 may receive a specific time period such as 'from Oct. 31, 2016, 13:00:00 to Oct. 31, 2016, 18:00:00'. In addition, the controller 130 may acquire an input corresponding to a display of a 'real-time image.'

The controller 130 according to an exemplary embodiment of the invention may display an image acquired using the surveillance camera 200, on the display unit 110. (S75) In this case, the image may be a real-time image or a recorded image. The controller 130 according to an exemplary embodiment of the invention may display sales data that is mapped to at least one point of sales of an image displayed on the display unit 110, with the image. (S76)

When displaying a real-time image, the controller 130 according to an exemplary embodiment of the invention may display the real-time image by updating sales data at each point of sales. For example, referring back to FIG. 4, the controller 130 may display the sales data 411 of the first customer of the first seller terminal 410 (of FIG. 3) from T1 which is a point of sales for the first customer of the first seller terminal 410 until T3 which is a point of sales for the second customer. In addition, the controller 130 may display the sales data 412 of the second customer of the first seller terminal 410 (of FIG. 3) from T3 which is a point of sales for the second customer of the first seller terminal 410 until T5 which is a point of sales for the third customer.

When displaying a recorded image, the controller 130 according to an exemplary embodiment of the invention may display sales data with an image mapped to the sales data, at the same time. For example, referring back to FIG. 4, when an image regarding the first customer of the first seller terminal 410 (of FIG. 3) is displayed (the image 211 of FIG. 4), the controller 130 may also display the sales data 411 (of FIG. 4) with respect to the first customer. Similarly, when an image regarding the second customer of the first seller terminal 410 (of FIG. 3) (the image 212 of FIG. 4) is displayed, the controller 130 may also display the sales data 412 (of FIG. 4) with respect to the second customer. However, this is exemplary, and the inventive concepts are not limited thereto, and various times of displaying sales data may be determined according to a setting by a user.

The controller 130 may determine so as to display an item corresponding to a keyword from among one or more items included in sales data, with a first display format, and to display the remaining items except the item corresponding to the keyword, with a second display format. The first display format may be, for example, a format of highlighting an item corresponding to a keyword, a format of displaying an item in bold, a format in which a displayed item is underlined, and a format in which a displayed item is blinking. The second display format may be one of a format in which the remaining items displayed are blurred and a format in which they are displayed as being transparent. However, the first display format and the second display format described above are examples, and the inventive concepts are not limited thereto. Thus, a format in which a certain item is emphasized may be used as the first display format according to the invention, and a format in which a certain item is displayed less distinguishably may be used as the second display format according to the invention, without limitation.

The controller 130 according to an exemplary embodiment of the invention may display sales data by displaying the sales data over an image. In addition, the controller 130 may display sales data on a second display unit (not shown) separately from an image.

The controller 130 according to an exemplary embodiment of the invention may determine a number of keywords included in one or more pieces of sales data mapped to one or more points of sales in a display time period, and display the determined number. (S77) Here, when a display image is a 'real-time image' as illustrated in FIG. 5A, the controller 130 may determine the number of keywords by setting a period from a certain time (for example, 0:00 of the corresponding day) to a current time. When a display image is a 'recorded image', the controller 130 may obviously determine the number of keywords in a time period set by a user.

The method of displaying sales data according to the exemplary embodiments of the invention can also be embodied as computer readable codes on a computer readable recording medium. The computer readable recording medium is any recording device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the invention can be easily construed by programmers skilled in the art to which the invention pertains.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A method of displaying sales data with images of scenes of sales transactions, the method comprising the steps of:
    obtaining the images of the scenes of the sales transactions by a camera;
    a sales data receiving operation of receiving, from a seller terminal, sales data including one or more first signals and a second signal different from the first signal;
    a point of sales determining operation of determining a time when the second signal is received as a point of sales;
    a mapping operation in which an image corresponding to a time period from a time before the point of sales by a non-zero first time interval to a time after the point of sales by a non-zero second time interval, is associated with the sales data;
    a first displaying operation of displaying a video image corresponding to at least one point of sales of the sales transactions among the images of the scenes of the sales transactions by a controller; and
    a second displaying operation of displaying sales data including one or more items associated with the at least one point of sales of the sales transactions by the controller; and
    a display format determining operation in which an item corresponding to a keyword descriptive of the one or more items is determined to be displayed with a first display format, and remaining items other than the item corresponding to the keyword among the one or more items are determined to be displayed with a second display format,
    wherein the first displaying operation and the second displaying operation are simultaneously performed by mapping the sales data including the one or more items on the video image corresponding to the at least one point of sales of the sales transactions in real time.

2. The method of claim 1, wherein the first display format comprises one of a format of highlighting the item corresponding to the keyword, a format of displaying the item in bold, a format in which the item is displayed underlined, and a format in which the item is displayed blinking.

3. The method of claim 1, wherein the second display format comprises one of a format of displaying the remaining items as being blurred and a format of displaying the remaining items as being transparent.

4. The method of claim 1, further comprising, before the first displaying operation, the steps of:
    a time period inputting operation in which a display time period corresponding to the image is received,
    wherein the display time period comprises at least one point of sales,
    wherein, in the step of the first displaying operation, an image corresponding to the display time period is displayed, and
    in the step of the second displaying operation, one or more pieces of sales data respectively mapped to the at least one point of sales in the display time period are displayed.

5. The method of claim 4, further comprising a third displaying operation of determining a number of keywords included in one or more pieces of sales data mapped to one or more points of sales in the display time period, and displaying the number.

6. The method of claim 5, wherein in the step of the third displaying operation, the number of each of the keywords is displayed with associated product names that match the keywords.

7. The method of claim 1, wherein, in the step of the sales data receiving operation, sales data is received from at least one of a first seller terminal and a second seller terminal.

8. The method of claim 1, further comprising, after the second displaying operation:
- a user input acquiring operation of acquiring a user input regarding an item to be registered, from among the one or more items of the displayed sales data; and
- a keyword adding operation adding a keyword that is to be registered and corresponds to the item to be registered based on a user input.

9. The method of claim 1, wherein, in the step of the second displaying operation, the sales data is displayed by displaying the sales data over the image.

10. The method of claim 1, wherein the step of the second displaying operation further comprises a display updating operation of updating a display of sales data mapped to a first point of sales to a display of sales data mapped to a second point of sales which is later than the first point of sales.

11. The method of claim 1, wherein the one or more first signals correspond to one or more sales start signals associated with one or more customers initiating a purchase at the seller terminal, and wherein the second signal corresponds to a sales completion signal associated with one of the one or more customers completing the purchase at the seller terminal.

12. The method of claim 11, wherein the sales data receiving operation further comprises receiving, from the seller terminal, a) purchaser identification information, b) payment method information, and c) a total amount of a purchase made by the one or more customers at the seller terminal.

* * * * *